United States Patent [19]

Stadlmeier et al.

[11] Patent Number: 5,167,027
[45] Date of Patent: Nov. 24, 1992

[54] APPARATUS AND METHOD FOR FORMING A SEQUENCER LINK FOR A SEQUENCER CONTROLLED BY A MICRO-PROGRAM

[75] Inventors: Hans Stadlmeier; Franz Schönberger, both of Munich, Fed. Rep. of Germany

[73] Assignee: Siemens Aktiengesellschaft, Munich, Fed. Rep. of Germany

[21] Appl. No.: 581,077

[22] Filed: Sep. 10, 1990

Related U.S. Application Data

[63] Continuation of Ser. No. 395,298, Aug. 17, 1989, abandoned, which is a continuation of Ser. No. 61,602, Jun. 19, 1987, abandoned, which is a continuation of Ser. No. 837,669, Mar. 4, 1986, abandoned, which is a continuation of Ser. No. 549,580, Nov. 7, 1983, abandoned.

[30] Foreign Application Priority Data

Nov. 9, 198? [DE] Fed. Rep. of Germany ....... 3241346

[51] Int. Cl.⁵ .................... G06F 9/40; G06F 9/42
[52] U.S. Cl. .................... 395/425; 364/938; 364/261.3
[58] Field of Search ............. 395/400, 375, 725, 800; 364/200 MS File, 900 MS File, DIG. 1, DIG. 2

[56] References Cited

U.S. PATENT DOCUMENTS

| 3,967,104 | 6/1976 | Brantingham | 364/900 |
|---|---|---|---|
| 3,991,404 | 11/1976 | Brioschi | 364/200 |
| 4,003,033 | 1/1977 | O'Keefe et al. | 364/200 |
| 4,038,533 | 7/1977 | Dummermuth | 364/900 |
| 4,095,266 | 6/1978 | Canubia et al. | 364/200 |
| 4,106,090 | 8/1978 | Erickson et al. | 364/200 |
| 4,179,737 | 12/1979 | Kim | 364/200 |
| 4,223,381 | 9/1980 | Rozell et al. | 364/200 |
| 4,254,461 | 3/1981 | Chemla et al. | 364/200 |

Primary Examiner—David Y. Eng
Attorney, Agent, or Firm—Herbert L. Lerner; Laurence A. Greenberg

[57] ABSTRACT

Apparatus for forming a sequence in a direct memory access controller. The apparatus includes a microprogram-controlled sequencer for selecting microaddresses, a software decoder connected to the sequencer for testing presence of jump conditions and for preparing a corresponding jump address, a map decoder connected to the sequencer for testing map conditions and for providing a map address, a test register connected to the sequencer for providing a test address, and apparatus for generating a continue-address connected to the sequencer. The jump conditions, the jump addresses and the map conditions are contained in microcommands of the microprogram.

13 Claims, 3 Drawing Sheets

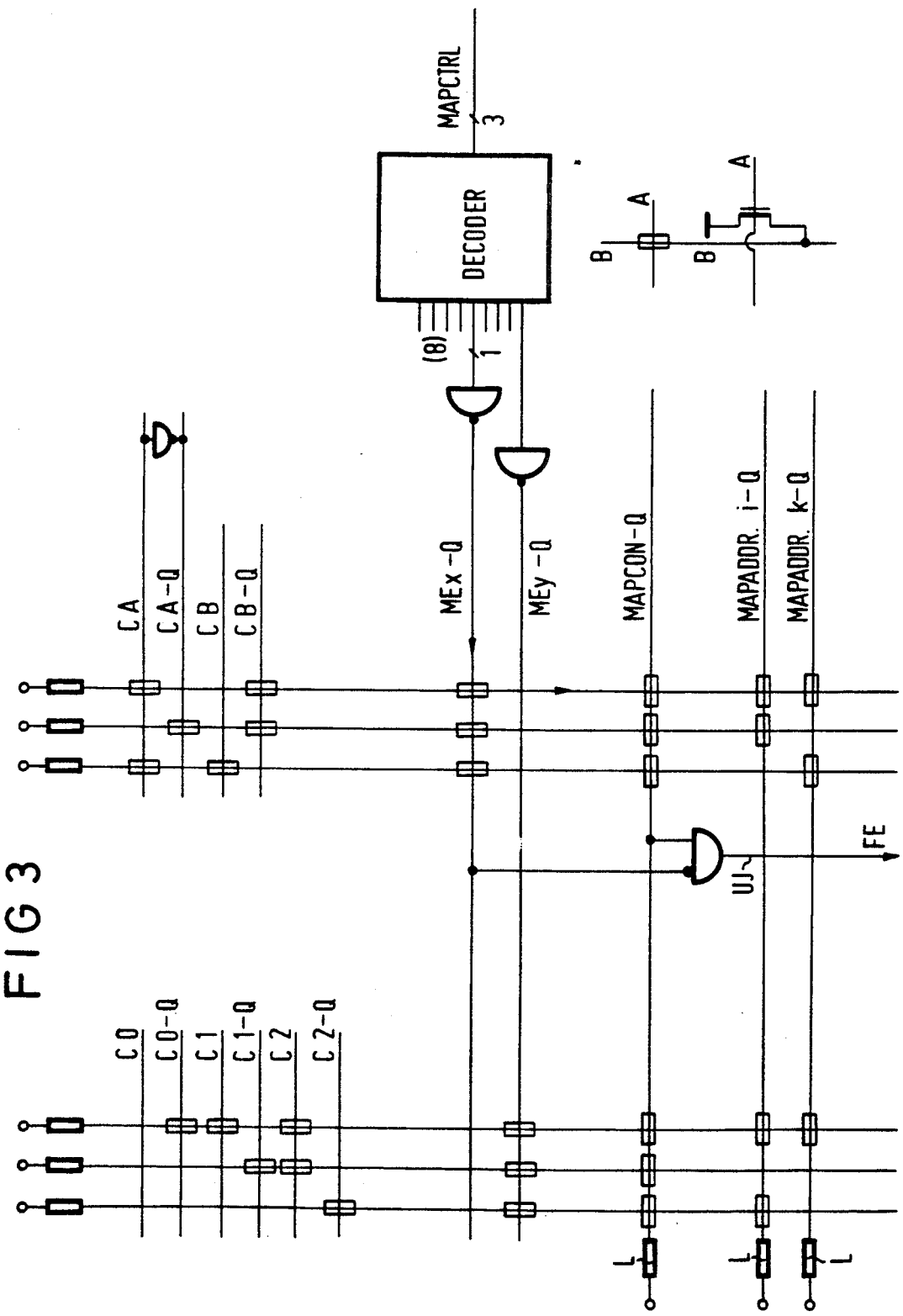

APPARATUS AND METHOD FOR FORMING A SEQUENCER LINK FOR A SEQUENCER CONTROLLED BY A MICRO-PROGRAM

This is a continuation of application Ser. No. 395,298, filed Aug. 17, 1989, now abandoned; which was a continuation of Ser. No. 061,602, filed Jun. 19, 1987, now abandoned; which was a continuation of Ser. No. 837,669, filed Mar. 4, 1986, now abandoned; which was a continuation of Ser. No. 549,580, filed Nov. 7, 1983, now abandoned.

BACKGROUND OF THE INVENTION

1. Field of the Invention

The invention relates to an apparatus for forming a sequencer link for a sequencer controlled by a microprogram, and a method for forming the sequencer link.

2. Description of the Prior Art

For example, an integrated high-performance DMA controller ADMA (advanced direct memory access) has four channels which are independent of each other and accomplish data transfer between media (memories, peripheral equipment) or, speaking more generally, between data sources and data sinks.

The main control of the channels is performed by microprograms, the microcommand sequence of which is controlled by a sequencer. The mode of operation of a sequencer is to provide a branching address if a test is fulfilled or a "continue" address (linear case) if a test is not fulfilled, in dependence on corresponding control information and states to be tested.

In view of the complex and time-critical tasks of the ADMA, the sequence control (control of the microcommand sequence) depends on a multiplicity of parameters, so that different control functions provided with different priorities are necessary in order to form a microaddress link. It has heretofore not been possible to provide high-power control functions, flexibility, light loading and testability of a module.

SUMMARY OF THE INVENTION

It is an object of the invention to provide an apparatus and method for forming a sequencer link for a sequencer controlled by a microprogram, which overcomes the hereinafore-mentioned disadvantages of the heretofore-known devices and methods of this general type, through which great power of the control function as well as optimum flexibility of the control can be achieved with light loading on the microwords and good testability of an electronic module controlled by the sequencer through optimum distribution of the tasks and functions to microcommands, hardware logic circuits and control registers.

With the foregoing and other objects in view there is provided, in accordance with the invention, an apparatus for forming a sequencer link for a sequencer controlled by a microprogram, including means connected to the sequencer for testing jump conditions and for preparing a corresponding jump address, the jump conditions and the corresponding jump address being contained in a microcommand, and means connected to the sequencer for testing map conditions and for preparing a map address, the map conditions being contained in a microcommand.

In accordance with another feature of the invention, there is provided means connected to the sequencer for providing a test address.

In accordance with another feature of the invention, there is provided means connected to the sequencer for providing a continue address.

In accordance with an additional feature of the invention, the means for testing map conditions and for preparing a map address are in the form of a PLA (programmable logic array) map decoder.

Further in accordance with the objects of the invention, there is provided a method for forming a sequencer link for a microprogram-controlled sequencer, which includes testing given conditions by means of a field with jump conditions in a microcommand, and providing a jump address in the microcommand if these conditions are met.

In accordance with another mode of the invention, the method includes controlling the formation of a map address by means of a field with a map control function in the microcommand.

In accordance with a further mode of the invention, there is provided a map decoder connected to the sequencer, which includes autonomously checking the map control function on signals corresponding to the map control function with the map decoder, and autonomously generating a corresponding map address.

In accordance with a further mode of the invention, there is provided a test register connected to the sequencer, which includes storing a test address in the test register, and selecting the test address with the sequencer if a corresponding request is present.

In accordance with an additional mode of the invention, the microcommand includes a control bit, which includes controlling the selection of a continue address with the control bit in the microcommand.

In accordance with an added mode of the invention, the method includes autonomously prioritizing with the map decoder in dependence on status and state information under a group of conditions of signals corresponding to the map control function, the conditions being addressed by the map control function, and delivering a map address corresponding to a given highest valid priority from the map decoder, in dependence on the highest respective valid priority.

In accordance with yet another mode of the invention, the microcommand includes a control bit, which includes controlling the selection of a continue address with the control bit, and selecting the continue address if no jump conditions or other condition with higher priority are set or met.

In accordance with yet a further mode of the invention, the method includes selecting the jump address if the jump conditions are met and other conditions with higher priority are not set or met.

In accordance with yet an additional mode of the invention, the method includes selecting the map address if the map conditions are met and conditions with higher priority are not set or met.

In accordance with yet an added mode of the invention, there is provided a test register connected to the sequencer, which includes storing a test address in the test register, selecting the test address with the sequencer if a corresponding request is present, and selecting the test address with the highest priority if the corresponding condition is set.

In accordance with an alternate mode of the invention, the method includes addressing different groups of conditions to be tested having different priority levels assigned thereto by means of the map control function, and generating different map addresses depending on the highest valid priority.

In accordance with a concomitant feature of the invention, there is provided an internal microcommand memory connected to the sequencer, which includes providing a condition causing an unconditional transfer of the incremented microprogram address to the internal microcommand memory with a priority immediately below the priority of the unconditional transfer of a test address.

In the ADMA, four main groups of link microaddresses can be distinguished, of which the sequencer always selects one. These four main groups of link microaddresses will be described below in the order of increasing priority:

a) Linear Sequence Address or "Continue" Address

It is chosen if no jump condition or other conditions described further on are present and met. The "continue" address, however, also depends on another parameter, namely, the type of the microcommand. In so-called organizational microcommands, the "continue" address is customarily the microaddress of the current microcommand incremented by 1; in the case of DMA commands or, speaking more generally, in the case of non-organizational microcommands, the "continue" address is equal to the current microcommand address.

b) Jump Address

It is selected if the conditions given by a control function (jump control) are met. One and the same "jump control" is to furnish different jump addresses if it is used in different microcommands. Example: The "jump control": "Not another source byte?" leads to a jump to the destination (data sink) DMA microcommand of the associated DMA microprogram, if the condition of this "jump control" is met.

c) Map Address

It is chosen if the conditions given by a control function ("map control") are met. The control function "map control" has a higher priority than the control function "jump control", which means that if the "map" condition is met, the map address is generated, and this occurs even though the "jump" condition may likewise be met.

Differing from the control function "jump control", one and the same control function "map control" always leads to the same map microprogram address if it is used in different microcommands, with the same conditions met. This is because, with a map microprogram address, generally common organization programs such as "end of treatment" or "data chaining" are to be addressed by the jump.

Further differences between the control function "map control" and the control function "jump control" are as follows:

A control function "map control" can address different groups of conditions to be tested which are prioritized in themselves and generate different map microprogram addresses depending on the highest valid priority of these conditions to be tested. For instance, the microcommand "Mux Idle Map" which causes a subchannel to wait for a request, leads to the map microprogram address of the corresponding start/stop microprogram if a start/stop subchannel request is made by the control processing unit (CPU) while, if a request for operating another already started subchannel is present simultaneously, the microprogram belonging to this other subchannel is executed with a lower priority.

One control function "map control" can generate different map microprogram addresses (comparable to multiple branching) without prioritizing due to the decoding of control bits in the central control register. Example: in a transfer map, the start address of the required DMA routine is made available as a function of entries in the command and mode registers which are accessible to the user.

d) Test Address

It is chosen if the control function "test control" prescribes the selection of any desired microcommand, and is formed with the highest priority.

Other features which are considered as characteristic for the invention are set forth in the appended claims.

Although the invention is illustrated and described herein as embodied in apparatus and method for forming a sequence link for a sequencer controlled by a microprogram, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

FIG. 3 is a schematic circuit diagram illustrating the principle of a PLA for a map decoder.

DESCRIPTION OF THE PREFERRED EMBODIMENT

Figure 1:
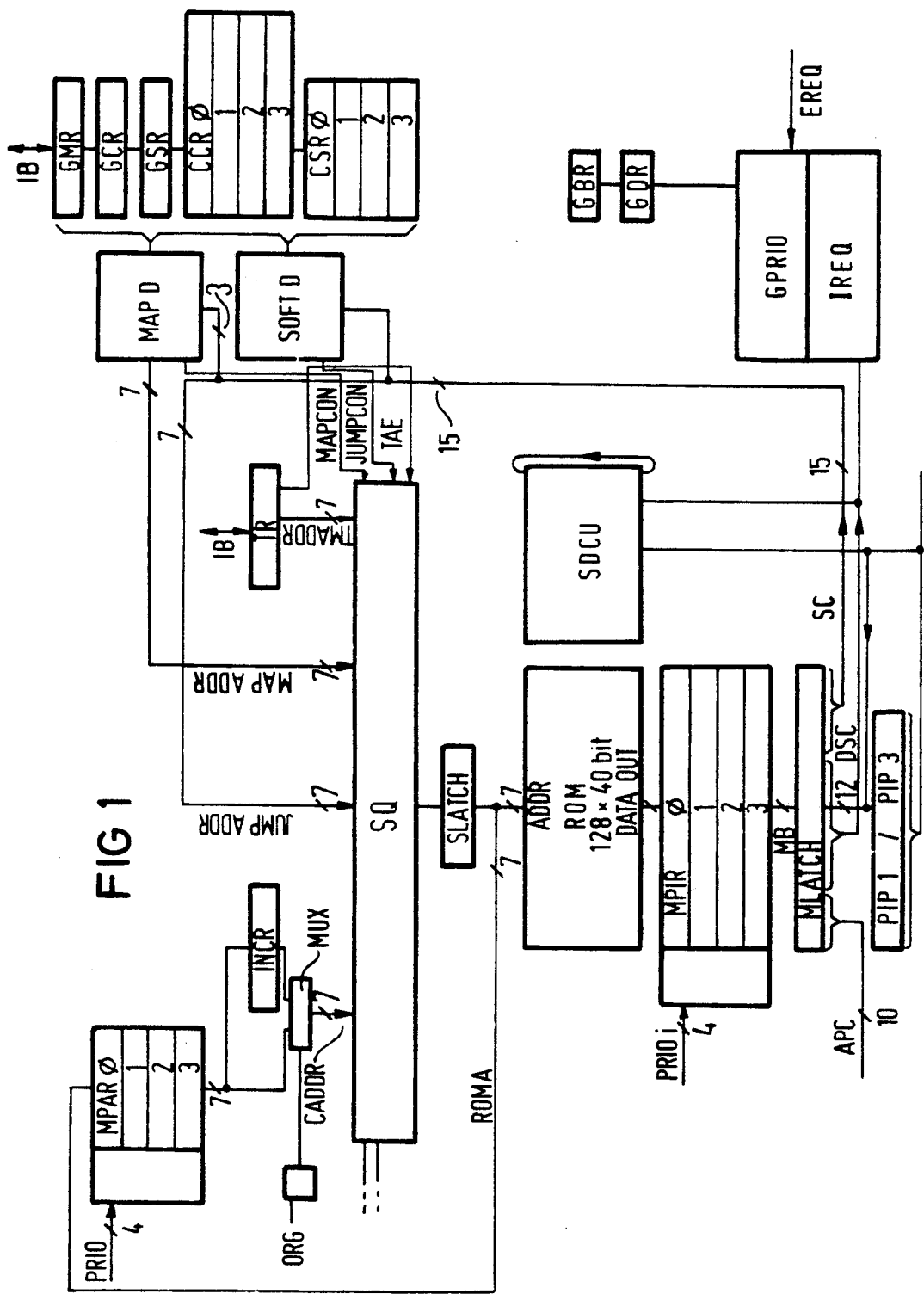
FIG. 1 is a block circuit diagram of an embodiment of the invention.

Referring now to the figures of the drawing in detail, and first particularly to FIG. 1 thereof, there is seen a block circuit diagram of an embodiment of the invention. A sequencer SQ is provided for receiving the four different addresses according to the main groups described above, namely the "continue" address CADDR, the jump address JUMP ADDR, the map address MAP ADDR and the test address TMADDR. Depending on the control information present from a microcommand MB or from a test register TR, respectively, the sequencer SQ selects priorities and microprogram address of the control information, depending on the corresponding test results.

The selection of the "continue" address CADDR is controlled by a control bit ORG from a field "instruction pipe control" JTC of the microcommand MB, which will be more fully discussed below with reference to FIG. 2. In so-called organizational microcommands, the "continue" address is a microprogram address ROMA of the actual current microcommand MB incremented by 1. In the case of so-called DMA commands, the "continue" address CADDR is the same as the current microcommand address ROMA. An incrementation of the current microcommand address ROMA which may be necessary is accomplished by an incrementer INCR. The control bit ORG is fed to a multiplexer MUX in order to control the selection between a current microcommand address ROMA incremented by +1 and a non-incremented current microcommand address ROMA. The current microcommand address ROMA includes 7 bits and can be stored in a microaddress register MPARi which is specific to a channel where i=0, 1, 2, 3. An ADMA with four channels contains four microaddress registers MPARi and four microinstruction registers MPIRi for the respective corresponding microcommand. One of these four channels is selected each time by a signal PRIOi from a prioritizing unit GPRIO. A channel is prioritized on the basis of external requests EREQ, internal requests IREQ, and requests from central control registers GBR, GDR. The microaddress ROMA selected by the sequencer SQ is stored for an interim period in an interim memory SLATCH and it reads the corresponding microcommand MB from a microcommand memory ROM. The microcommand memory ROM contains 128×40 bits. The respectively prioritized microcommand MB is stored for an interim period in a microcommand interim memory MLATCH.

Figure 2:
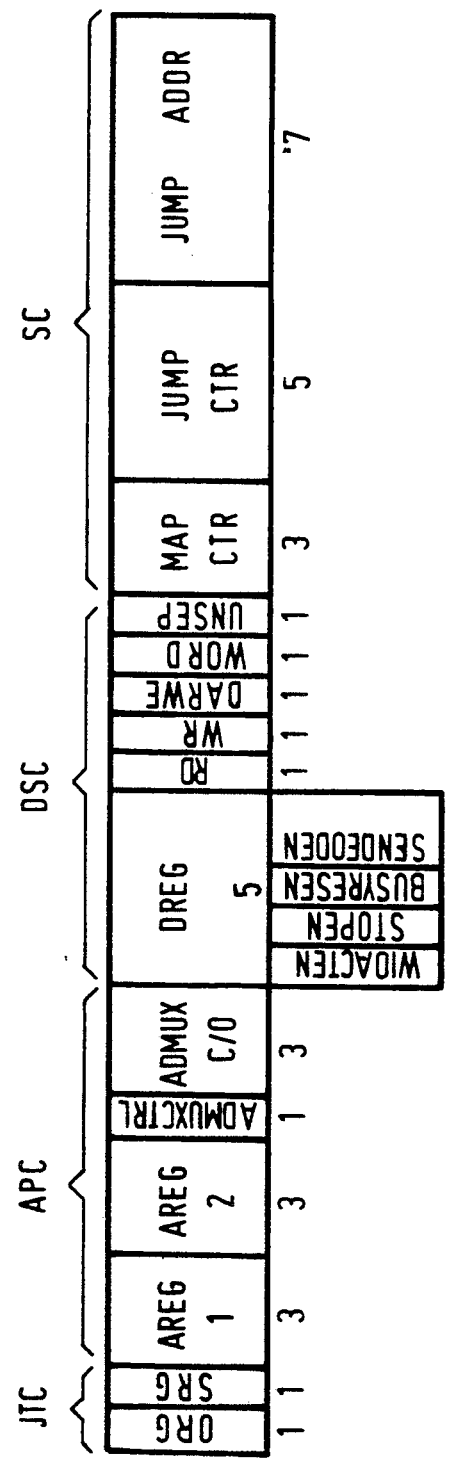
FIG. 2 is a diagrammatic representation of a microword which can be used in an embodiment of the invention.

FIG. 2 shows different fields of a microcommand MB which can be used in the embodiment according to the invention shown in FIG. 1. The field JUMPCTR ("jump control") in a sequence control field SC of the microcommand MB tests certain conditions and, if these conditions are met, prepares the jump address JUMPADDR which is likewise taken along the microcommand MB. This jump address JUMPADDR is carried along in the microcommand MB because one and the same control function JUMPCTR in different microcommands MB leads to different jump addresses JUMPADDR. The sequence control field SC of the microcommand MB contains a total of 15 bits. The number of bits is indicated throughout FIG. 1. Seven of the 15 bits are formed by the jump address JUMPADDR which is carried along and 5 bits are formed of the test condition, with which a soft decoder SOFT D shown in FIG. 1 is addressed. The soft decoder SOFT D checks whether or not the jump conditions contained in the field JUMPCTR are met, on the basis of information contained in different control registers GMR (operating mode), GCR and CCR (start/stop of the channels), GSC and CSR (status of the four channels). If these jump conditions JUMPCTR are met, this fact is communicated by the soft decor SOFT D to the sequencer SQ through a signal JUMPCON.

The field with the map control MAPCTR in the microcommand MB controls the formation of the map address MAP ADDR. A map decoder MAP D shown in FIG. 1 autonomously checks whether or not the map control function MAPCTR is valid, on the basis of the information contained in the registers GMR, GCR, GSR, CCR and CSR. In addition, the map decoder MAP D autonomously performs a prioritizing of the different conditions addressed by the map control MAPCTR. The map decoder MAP D then furnishes the corresponding map address MAP ADDR as far as hardware. The map decoder MAP D communicates information to the sequencer SQ over a signal MAPCON as to whether or not the conditions required by the map control MAPCTR are met.

The unconditional transfer of the test address TMADDR is accomplished by the test register TR. This test register TR can be written-into by a central processing unit (CPU) through an internal data bus IB, which permits the test of the ADMA.

If a TAE ("test address enable") bit is set in the test register TR, the test address TMADDR likewise contained in the test register TR is selected by the sequencer SQ. In this way, any desired microcommand addresses ROMA can be entered and the corresponding microcommands MB can then be executed.

Besides the sequence control SC, the microcommand of FIG. 2 also contains an address pointer control APC and a data transfer control DSC in addition to the above-discussed "instruction type control" JTC. The data transfer is monitored by a data control unit SDCU. A device PIP1/PIP3 serves for pipelining in the execution of different microcommands.

The three bits of the control function MAPCTR are decoded in the map decoder MAP D. Three bits result in eight possible interrogation conditions. The map decoder MAP D is in the form of a PLA ("programmalble logic array"), having inputs at which different groups of conditions to be tested and their respective priority ranking are present, depending on the respective current control function MAPCTR. Different addresses MAP ADDR are generated at outputs of the PLA, depending on the highest valid priority. This is done as a function of the respective current control function MAPCTR, as a function of the conditions addressed by the current control function MAPCTR, and as a function of its prioritizing.

The manner in which a PLA can be constructed and used such that given outputs have a predetermined dependence on certain inputs, can be seen from the textbook by C. Mead and L. Conway, entitled "Introduction to VLSI Systems", published by Addison-Wesley, and particularly from chapter 3.10, "The Programmable Logic Array".

FIG. 3 shows the structure of a PLA for a map decoder MAP D. FIG. 2 shows the number of control bits below the fields and FIG. 3 shows three control bits MAPCTR which are designated with reference symbol MAPCTRL and arrive at a DECODER which has eight outputs. The inverted outputs (MEx-Q, MEy-Q represents an inverted signal MAPENABLE) are connected to the respective bases of several MOS transistors. In the case of a purely static decoder, conditions CA, CB and inverted signals CA-Q, CB-Q thereof have no priority ranking among themselves. The conditions CA and CB can come from control registers, status registers and an error detection. The conditions CA, CB and their inverted signals control different base electrodes of MOS transistors in such a manner that three of the four possible combinations can be interrogated for given conditions CA, CB over different lines, to which the drain electrodes of these MOS transistors are connected. The line MEx-Q performs an interrogation as to which of these three combinations are valid. The result of this interrogation is again communicated through MOS transistors to the inverted control line MAPCON-Q. If the fourth possible combination of the conditions CA, CB, which is not interrogated by the line MEx-Q is met, then the line MAPCON is not activated. If the line MAPCON is activated, a map address is simultaneously selected through the base electrodes of MOS transistors and through the inverted signals MAPADDR i-Q, MAPADDR k-Q. If the signal MEx-Q is a logical zero and if at the same time the inverted control signal MAPCON-Q is a logical 1, an unconditional jump is initiated through a gate UJ by an output signal FE (fatal error).

In a prioritized decoding case, a condition C2 has the highest priority, a condition C1 has the second highest priority, and a condition C0 has the lowest priority. Only a single MOS transistor is connected to the line which is activated if the condition C2 prevails. The base of the transistor is controlled by the inverted signal C2-Q, by the signals for these three conditions, and by their inverted signals. Two MOS transistors are connected to the line which is activated if the condition C1 has the highest valid priority. The base electrodes of the transistors are controlled on one hand by the inverted signal C1-Q, and on the other hand, by the signal C2. Three MOS transistors are connected to the third line which is actived with the highest valid priority if the condition C0 is present. The base electrodes of the transistors are controlled firstly by the signal C1, secondly by the signal C2, and thirdly by the inverted signal C0-Q. The presence of these last-mentioned conditions together with their internal prioritization is interrogated over the line MEq-Q. The activation of the map decoder outputs corresponds to the purely static decoding case. The lines which are connected-through to a logical zero by addressing the base electrodes of MOS transistors, are connected to a supply voltage through load transistors L.

A bit ROMSPILL can set in order to permit the content of the microcommand memory ROM to be read out in a production test of the electronic modules. If the bit ROMSPILL is activated, the incremented current microprogram address is selected as the next current microcommand address ROMA with such a priority that it is only exceeded by the priority of the selection of the test address if the bit TAE is set.

The foregoing is a description corresponding, in substance, to German application P 32 41 346.7, dated Nov. 9, 1982, International Priority of which is being claimed for the instant application, and which is hereby made part of this application. Any material discrepancies between the foregoing specification and the specification of the aforementioned corresponding German application are to be resolved in favor of the latter.

There are claimed:

1. Apparatus for forming a sequence address in a direct memory access controller, comprising: a microcommand-controlled sequencer for selecting microaddresses, a microcommand register connected to said sequencer, said microcommand register containing microcommands being part of a microprogram stored in a memory, said microcommands controlling said sequencer, priority controlled selecting means including a software decoder connected to said sequencer for determining presence of jump conditions and for preparing a corresponding jump address, a map decoder connected to said sequencer for determining presence of map conditions and for providing a map address, said map decoder having a programmable logic array being controlled by internal and external conditions, for forming said map address, a corresponding test register being written into by an external device connected to said sequencer for providing a test address, and continue-address generating means including means for forming an incremental address or a non-incremental address, depending on conditions contained in the microcommand, connected to said sequencer for providing a continue-address, wherein the jump conditions, the jump address and the map conditions are contained in said microcommands and said software decoder, map decoder, continue-address generating means and said test register each have a different priority for forming addresses with different priorities.

2. Method for forming sequential addresses in a direct memory access controller having a sequencer controlled by micro-commands for selecting microcommand addresses, a microcommand register for storing microcommands, connected to the sequencer, said microcommands being part of a program stored in memory, the method comprising the steps of:

(a) controlling said sequencer with said microcommands, and determining with a software decoder connected to the sequencer presence of jump controls, and if present, preparing a corresponding jump address;

(b) determining with a map decoder having a programmable logic array controlled by internal and external conditions, connected to the sequencer presence of map control functions, and if present, preparing a corresponding map address;

(c) supplying from an external device a test address and storing the test address in a test register connected to the sequencer;

(d) generating, depending upon conditions present in the microcommand, a continue-address as an incremental or non-incremental continue-address;

(e) determining a priority of each of the jump address, the map address, the test address and the continue-address, said priority being embedded in said addresses; and (f) selecting with priority controlled selecting means as the sequential address the address with the highest priority.

3. Method according to claim 2, which comprises the steps of: autonomously testing, in response to a combination of conditions selected by said map control functions, wherein different priorities can be assigned to respective different conditions, the map control function, assigning to a satisfied condition a higher priority and to all other also selected conditions a lower priority, and autonomously generating a map address if the respective map control functions are present.

4. Method according to claim 3 which comprises the steps of: determining priorities in response to a group of conditions being addressed by the map control function, determining, depending upon status and condition information contained in the map control function if highest priority is indicated, and generating, in case a highest priority is found, a corresponding map address.

5. Method according to claim 2, which comprises the steps of: storing the test address in the test register, and selecting the test address with the sequencer if a test address request is present.

6. Method according to claim 2, wherein the microcommand includes a control bit, which comprises the steps of: controlling the selection of a continue address with the control bit in the microcommand and selecting one of an incremental address or a non-incremental address in response to said control bit.

7. Method according to claim 2, wherein the microcommand includes a control bit, which comprises the steps of: controlling the selection of a continue address with the control bit, and selecting the continue address if no jump control, no map control and no test control is present.

8. Method according to claim 2, which comprises the steps of: selecting the jump address if the jump control is present and no map control and no test control is present.

9. Method according to claim 2, which comprises the steps of: selecting the map address if the map control is present and no test control is present.

10. Method according to claim 2, which comprises the steps of: storing a test address in the test register, selecting the test address with the sequencer if a corresponding request is present, and selecting the test address with the highest priority if the corresponding condition is set.

11. Method for forming sequential addresses in a direct memory access controller having a sequencer controlled by micro-commands for selecting microcommand addresses, a microcommand register for storing microcommands connected to the sequencer, said microcommands being part of a program stored in memory, the method comprising the steps of:
 (a) controlling said sequencer with said microcommands, and determining with a software decoder connected to the sequencer presence of jump controls, and if present preparing a corresponding jump address;
 (b) determining with a map decoder having a programmable logic array controlled by internal and external conditions, connected to the sequencer presence of map control functions, and if present, preparing a corresponding map address;
 (c) supplying from an external device a test address and storing the test address in a test register connected to the sequencer;
 (d) generating, depending upon conditions present in the microcommand, a continue-address as an incremental or non-incremental continue-address;
 (e) embedding the jump control function, jump address control function and map control function in the microcommand;
 (f) assigning to each jump address, map address, test address and test address a priority;
 (g) selecting with priority controlled selecting means the address with the highest priority; and
 (h) if the selected address is a map address, controlling the formation of the map address by means of a map control field stored in the microcommand.

12. Method according to claim 11, which comprises the steps of: addressing different groups of conditions to be tested having different priority levels assigned thereto by means of the map control function, and generating different map addresses depending on the highest valid priority.

13. Method according to claim 11, which comprises the steps of: in response to a combination of conditions selected by said map control functions, wherein different priorities can be assigned to respective different conditions, the map control function of assigning to a satisfied condition a higher priority and to all others also selected conditions a lower priority, autonomously generating a map address if the map control functions are present, determining in response to one of a group of conditions being addressed by a map control function; or depending upon status and condition information contained in the map control function if highest priority is indicated, and generating in case a highest priority is found, a corresponding map address.

* * * * *